Feb. 9, 1943.  C. O. JOHNSTON  2,310,738
EDUCATIONAL AND DISPLAY DEVICE
Filed April 8, 1941   2 Sheets-Sheet 1
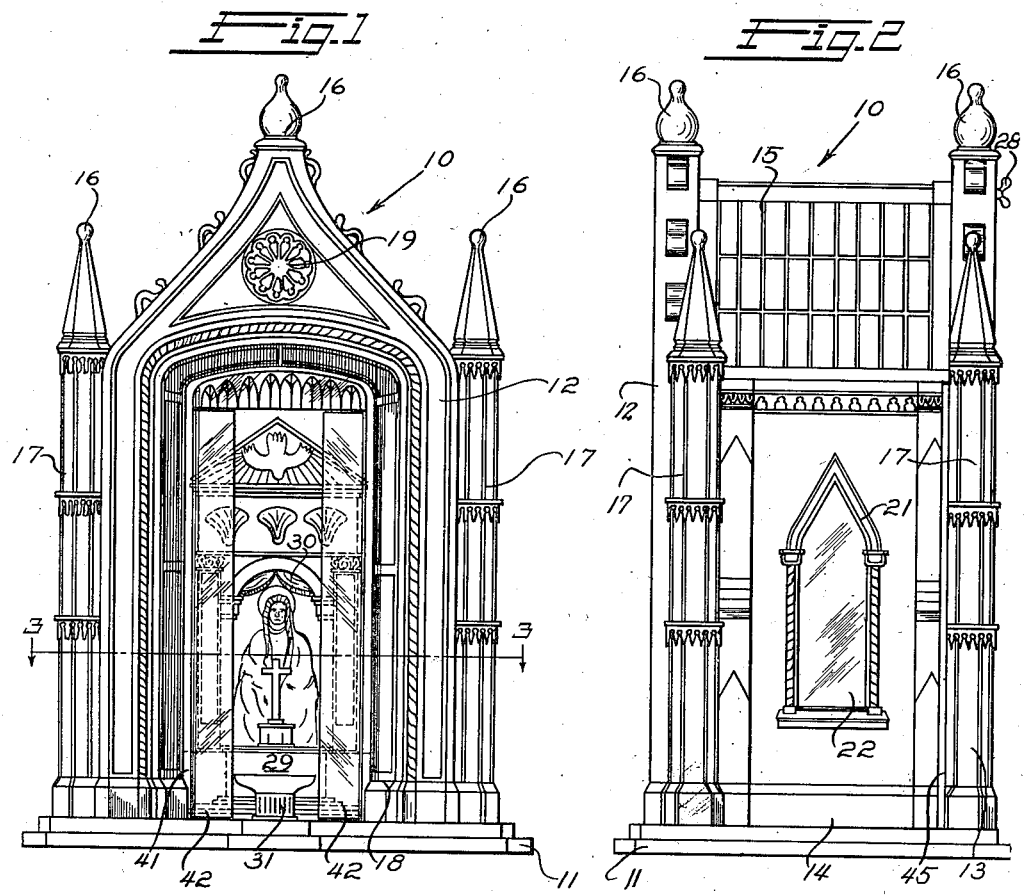
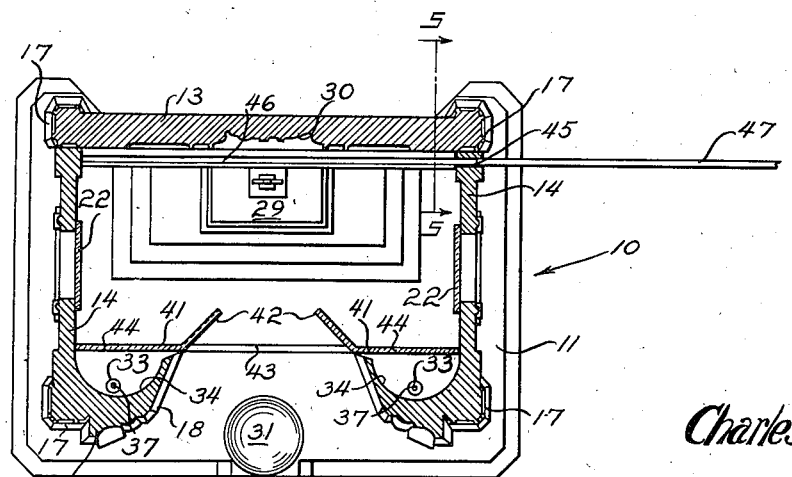
Inventor
Charles O. Johnston
By
Thomas A. Babbington
Attorney Feb. 9, 1943.  C. O. JOHNSTON  2,310,738
EDUCATIONAL AND DISPLAY DEVICE
Filed April 8, 1941   2 Sheets-Sheet 2

Inventor
Charles O. Johnston
By Thomas A. Babbington
Attorney

Patented Feb. 9, 1943

2,310,738

UNITED STATES PATENT OFFICE 2,310,738

EDUCATIONAL AND DISPLAY DEVICE

Charles O. Johnston, Wilmington, Del.

Application April 8, 1941, Serial No. 387,489

4 Claims. (Cl. 35—23)

The present invention relates to a religious teaching device and picture and plaque display apparatus. More particularly the present invention provides a device for displaying religious masterpieces in an inspirational setting.

In teaching religious subjects and biblical stories, it is customary to impart the subject orally to the pupils and have them read and study religious history. Many pupils, particularly children, find it difficult to understand religious teachings and their attention drifts during lectures. To overcome these tendencies, the present invention proposes to appeal to the visual senses of the pupils by displaying the many beautiful and inspirational pictures and plaques depicting religious stories and feast days. In this way, the attention of the pupils can be directed to a concrete object of beauty imparting the story to the eye while the story is being explained orally.

The present invention also enables persons who desire a religious shrine in the home to provide themselves with a truly inspirational and instructive shrine of great beauty and religious value.

It is a primary object of this invention to provide a structure adapted to exhibit religious paintings and other works of art in an inspirational setting and a manner to emphasize the artistic beauty and details of such paintings and works of art.

A further important object of this invention is to provide a religious teaching aid adapted to be readily changed to teach various religious stories and depict the various church feast days.

Still another object of this invention resides in constructing a miniature church having an altar and means for displaying a religious painting or work of art as a background for the altar.

Still another object of the present invention resides in the provision of a miniature church or shrine for home and school room use.

A further object of the present invention resides in providing a miniature church or shrine adapted for displaying religious pictures or the like with indirect, diffused lighting composed of light rays including at least the primary colors.

Other objects will appear as the description and appended claims are read in conjunction with the attached drawings wherein:

Figure 1 is a front elevational view of a miniature church made in accordance with the present invention;

Figure 2 is a side elevational view of Figure 1;

Figure 3 is a sectional view taken on line 3—3 of Figure 1;

Figure 4:
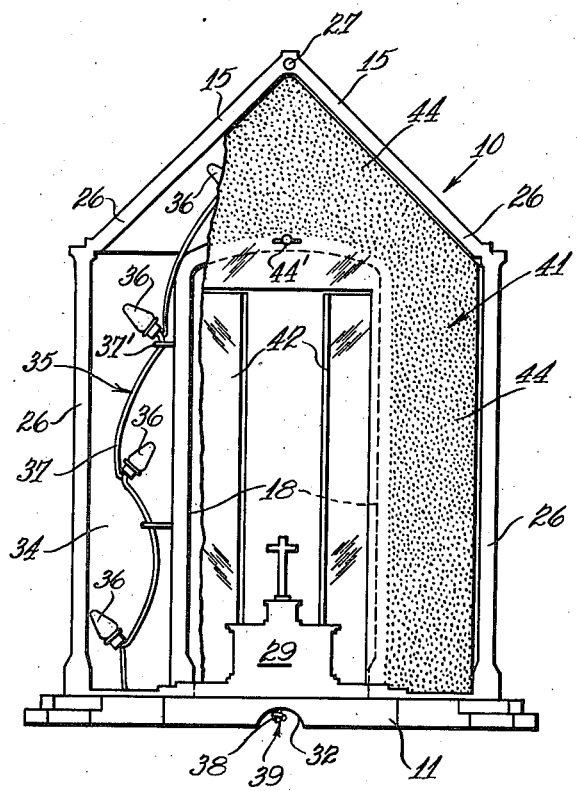
Figure 4 is a rear elevational view of Figure 1 with the back panel removed so as to illustrate the interior of the structure of Figure 1.
Figure 5:
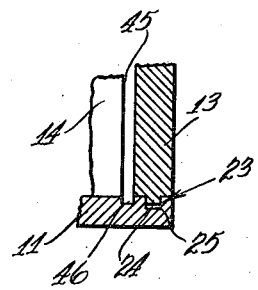
Figure 5 is a partial sectional view taken on line 5—5 of Figure 3.
Figure 6:
Figure 6 is an elevational view of a typical religious picture capable of use in accordance with this invention.

With continued reference to the drawings wherein like reference numerals are employed throughout the several figures to indicate the various parts, the numeral 10 designates a miniature church, chapel or shrine made in accordance with this invention.

Shrine 10 comprises a base 11, a front panel 12, a removable rear panel 13, side panels 14 and a top or roof 15. Preferably these panels are ornamented in imitation of one of the many famous churches or cathedrals. To this end, the front panels are provided with spires 16 and ornamental columns 17 and the front panel has an ornamental doorway 18 and open work decorations 19. Side panels 14 are also preferably provided with ornamented window openings 21 containing stained glass windows 22.

The back panel 13 is preferably held in place by a mating tongue and groove formation 23 formed by tongue 24 on the lower edge of panel 13 and groove 25 formed in base 11. The upper end of panel 13 is held against the edge surfaces 26 of panels 14 and roof 15 by a bolt 27 embedded in roof 15 and a wingnut 28.

Base 11 is provided with an altar 29 and a holy water font 31. The under surface of base 11 is also provided with a downwardly opening groove 32 and vertical openings 33 the purpose of which will be presently pointed out.

The inner face of back panel 13 is preferably provided with a bas relief 33 reproduction of a famous religious work of art such as that of the Blessed Virgin in the Shrine of the Blessed Virgin at the Vatican in Rome. This bas relief is aligned with doorway 18 so as to be seen through and framed by the doorway and forms a background for the altar 29.

Front panel 12, as clearly seen in Figure 3, provides an inwardly opening semi-circular recess 34 surrounding doorway 18. Recess 34 is designed to receive electrical illuminating means 35 consisting of a plurality of differently colored light bulbs 36 interconnected by electrical wires 37. Suitable wire loops 37' embedded in panel 12 retain means 35 in place in recess 34 where it is hidden from the direct view of the observer. Wires 37 extend downwardly through apertures 33 and are twisted together as shown at 38 to form an electrical cord 39. Cord 39 is housed in groove 32 and is provided with a suitable plug (not shown) adapted to be connected to any suitable source of electrical energy.

The open side of recess 34 is adapted to be closed by a glass panel 41. Panel 41 provides inwardly sloping door portions 42. The lower edge of panel 41 is disposed in a groove 43 formed in base 10 and the panel is of such shape and size as to extend completely from side to side and roof to base of the shrine as seen in Figure 4. A marginal face 44 of panel 41 is suitably frosted by etching, sandblasting or the like to diffuse the rays of light emanating from bulbs 36 so as to softly illuminate the interior of the shrine and prevent glare. A bolt and nut assembly 44' secures panel 41 in place against the surface of panel 12 surrounding doorway 18.

One side panel 14 is preferably provided with a vertical slot 45 (Figures 2 and 4) disposed in alignment with a groove 46 formed in base 11 directly behind altar 29. Slot 45 is designed to cooperate with back panel 13 to receive a religious picture 47, the lower edge of which fits within groove 46. Groove 46, back panel 13 and slot 45 cooperate with picture 47 to retain it in proper upright position behind altar 29 and permit ready assembly and removal of the picture 47.

In the use of this device, it is preferable to provide a plurality of pictures, each of which depicts a biblical story or a religious feast day. To secure the full benefit of the present invention, each of these pictures preferably comprises a faithful reproduction of a well known masterpiece, for example, Raphael's "Virgin and Child Enthroned with Saints," or similar expressive works of art. These pictures are preferably formed by a novel process, not a part of the present invention, capable of reproducing the fine coloring and detail of these famous works of art. In this way the users or students are able to visualize the religious theme and at the same time acquire an appreciation of the artistry of the famous painters of past and present generations.

The present invention is peculiarly adapted to the display of these faithful reproductions due to the novel lighting arrangement of this invention. In this connection, it has been found that the diffused lighting obtained by the combination of the differently colored light bulbs brings out the fine coloring and details of these masterpieces in a surprising manner and permits an unusually critical study of the artistic ability of the artist.

While the panels and base of the shrine may be formed in any suitable manner and from any desired material, the present invention contemplates the formation of the shrine by a novel casting method, using composition marble, plasters or other suitable materials. This method forms no part of the present invention and is to be made the basis of an independent application for patent.

While the present invention is particularly described in connection with the teaching and study of religious subjects, it is equally capable of use in teaching art appreciation generally and in this connection it is to be understood that the church or shrine may be replaced by any other appropriate inspirational edifice.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A religious teaching aid comprising a miniature church including a removable back, ornamental sides and an ornamental front having a door opening adapted to frame a portion of the interior of said church, an altar within said church and framed by said doorway, a plaque formed on the interior surface of the back and framed by said doorway, a source of light surrounding said doorway and concealed from view by the adjacent area of said front, a glass panel disposed against the inner marginal face of said doorway and providing a pair of partially opened transparent doors and extending from side to side of said church and overlying said source of light, said portion of said glass panel overlying said source of light being frosted to diffuse the rays of light from said source and prevent glare or high lights in the interior of said church.

2. A miniature church adapted for school or home use comprising a base, front and side walls, a top and a removable back; said front wall having a doorway defined by inwardly sloping wall sections cooperating with the side walls and the top to provide a recess surrounding the door opening at the sides and top and concealed from view by said front and side walls; said base being provided with an upstanding altar in alignment with said doorway, apertures within the confines of said recesses and a transverse groove terminating at the side walls and adapted to receive a glass panel; a glass panel conforming in shape to the transverse cross-sectional shape of said church and having a central opening through which the altar may be viewed; said glass panel having its marginal surface overlying said recess frosted to diffuse rays of light passing through said marginal surface; electric lights disposed in said recess and adapted to project rays of light through said marginal surface to illuminate said church and said altar and electrical wiring passing through said apertures in said base to a source of electrical energy.

3. A religious shrine designed to pictorially teach religious themes in the home comprising a miniature church having a doorway adapted to afford a view of the interior of the church and frame a pictorial religious theme, a picture illustrating a religious theme disposed within said church adjacent the rear thereof, means for removably supporting said picture whereby it may be readily replaced, means for illuminating the interior of said church, said means being disposed within said church adjacent said doorway so as to be concealed from the view of the observer and a translucent panel disposed between said illuminating means and said picture and having a frosted portion overlying said illuminating means to diffuse the light rays and eliminate glaring spots on said picture.

4. In a miniature church having a doorway through which may be viewed the rear part of the church, a multicolored picture mounted adjacent the rear of the church, and means for illuminating the picture in a manner to emphasize the natural coloring and detail comprising sources of light adapted to simultaneously project rays of differently colored light disposed in front of the picture and concealed from the view of an observer, and a translucent panel disposed between the sources of light and the picture to diffuse the light rays and prevent glare spots on the picture.

CHARLES O. JOHNSTON.